United States Patent [19]

Woffinden et al.

[11] Patent Number: 4,780,809
[45] Date of Patent: Oct. 25, 1988

[54] APPARATUS FOR STORING DATA WITH DEFERRED UNCORRECTABLE ERROR REPORTING

[75] Inventors: Gary A. Woffinden, Scotts Valley; Joseph A. Petolino, Jr., Mountain View, both of Calif.

[73] Assignee: Amdahl Corporation, Sunnyvale, Calif.

[21] Appl. No.: 45,756

[22] Filed: Apr. 28, 1987

Related U.S. Application Data

[63] Continuation of Ser. No. 894,518, Aug. 8, 1986, abandoned, which is a continuation of Ser. No. 527,671, Aug. 30, 1983, abandoned.

[51] Int. Cl.[4] .............................................. G06F 11/00
[52] U.S. Cl. ....................................... 364/200; 371/16
[58] Field of Search ................... 364/200, 900; 371/14, 371/16, 38

[56] References Cited

U.S. PATENT DOCUMENTS

| 3,873,819 | 3/1975  | Greenwald     | 371/16  |
| 4,058,851 | 11/1977 | Scheuneman    | 371/38  |
| 4,296,494 | 10/1981 | Ishikawa et al. | 371/38 |
| 4,317,168 | 2/1982  | Messina et al. | 364/200 |
| 4,319,357 | 3/1982  | Bossen        | 371/38  |
| 4,375,664 | 3/1983  | Kim           | 371/38  |
| 4,453,211 | 6/1984  | Askinazi et al. | 4/4   |

*Primary Examiner*—David Y. Eng
*Attorney, Agent, or Firm*—Fliesler, Dubb, Meyer & Lovejoy

[57] ABSTRACT

The reporting of errors that are detected when data which contains an error is moved from a high speed buffer memory array to a main storage array is deferred so that the error checking and correcting logic associated with the main storage memory array will recognize the data as containing an error generated in the buffer array and report the error only when the data is moved out of the main store. In this manner, a process relevant to the erroneous data is assured to be in operation when the error is reported.

16 Claims, 2 Drawing Sheets

APPARATUS FOR STORING DATA WITH DEFERRED UNCORRECTABLE ERROR REPORTING

This is a continuation of application Ser. No. 894,518, filed on 8/8/86, now abandoned, which is a continuation of 527,671, filed on 8/30/83, now abandoned.

CROSS-REFERENCE TO RELATED APPLICATION

The present application is related to U.S. Patent entitled APPARATUS FOR REDUCING STORAGE NECESSARY FOR ERROR CORRECTION AND DETECTION IN DATA PROCESSING MACHINES, filed Aug. 30, 1983, issued Mar. 17, 1987, Ser. No. 527,677, U.S. Pat. No. 4,651,321.

FIELD OF THE INVENTION

This invention relates to memory systems in data processing machines. More specifically, the field of this invention is error detection and correction in memory systems in data processing machines.

BACKGROUND OF THE INVENTION

In large data processing machines, data is moved in and out of a set of memory arrays in order for the data processing machine to perform operations on the data. When the data in these memory arrays contains an error (which occur for a variety of reasons, for instance, intermittant failures in memory devices), that error must be detected and if possible corrected. Therefore, data processing machines often have error checking and correcting logic associated with the memory arrays in the machine.

Often the memory arrays in data processing machines are arranged into two major systems: a large-capacity main storage array or main store; and a smaller fast-access storage array called the buffer. The data processing machines operate by accessing data from the buffer which in turn retrieves currently active data from the main store. By using a fast-access buffer storage array the machine reduces the apparent main store access time for retrieving data.

Because the buffer is usually much smaller than the main store, the machine has the ability to move data out of the main store and into the buffer when the data requested is not resident in the buffer. Likewise, the buffer transfers inactive data out, and (if modified) moves it into the mainstore when the buffer is full in order to make room for currently active data being moved into the buffer.

Errors can occur while data is stored in the buffer, while it is being transferred to and from the main store, and while it is stored in the main store. Thus, data processing machines of this type have what is known as error checking and correcting logic associated with the data that is moved in and out of the memory arrays. Typically, the error checking and correcting logic is implemented by creating an error checking and correcting code, or ECC code, when data is moved into a memory array and then storing that code in the memory array. When the data is moved out of the array, the ECC code is then recomputed and compared with the code that has been stored. If the codes match, then the data is correct and the moveout proceeds. If the codes do not match, an error analysis is performed. If the error is correctable, then it is corrected. If the error is incorrectable, then the active process is normally interrupted by a machine check interrupt. During machine check processing that occurs after the interrupt it is desirable to be able to identify the damaged process. If it can be determined that the damage was confined to the process active at the time of the machine check, then only the damage process needs to be terminated. Otherwise a more catastrophic damage condition must be claimed.

In a multiprogramming environment, data moved into the buffer by the currently active process may displace buffer-resident data which may belong to another process. If the error checking and correcting logic detects an uncorrectable error on the move-out of the old data from the buffer and generates a machine check at that time, there has not been any easy way to identify the program with which the old data was associated. Therefore, the machine check must claim system damage leading to a more catastrophic interruption than would be necessary if the damage were confined to the harmed process.

Thus, there is a need for an apparatus by which to defer the machine check that would normally occur when an uncorrectable error is detected upon the move out of data from the buffer until the data is accessed from the main store by a program with which it is associated so that a lesser error condition can be generated by the machine.

SUMMARY OF THE INVENTION

The present invention provides an apparatus for storing data in a data processing machine which comprises a first storage unit, such as a buffer, and a second storage unit, such as a mainstore. Associated with the first storage unit is a first error code means which checks for errors in the data when data is moved out of the first storage unit and generates an error signal when the data contains an error. The first error code means includes a first error code generator for generating a first move-in error code for the data as it is moved into the buffer and storing the code along with the data. Further, it includes a first error code checking means for generating a first move-out error code when the data is moved out of the buffer and comparing the first move-in error code to the first move-out error code. If the first move-in error code matches the first move-out error code then no detectable error occured in the data. If the codes do not match and the error is uncorrectable, then the first error signal is generated.

Associated with the second storage unit is a second error code means which likewise checks for errors in the data when the data is moved out of the second storage unit and generates a second error signal when the data contains an error. The second error code means includes a second error code generator for generating a second move-in error code for the data as the data is moved in to the second storage unit and storing the code along with the data. Further it includes a second error code checking means for generating a second move-out error code when the data is moved out of the second storage unit and comparing the second move-out error code to the second move-in error code. If the codes match then no error is detected. If the codes do not match and the error is uncorrectable then the second error signal is generated.

The first error signal is received by an error processing means which relays it to the second error code means associated with the second storage unit. In this manner, the data is recognizable by the second error code means as having had an error when it was moved out of the first storage unit into the second storage unit. The second error code generator will generate a second move-in error code that indicates the error existing in the data as detected by the first error code means. Thus, the second error signal is generated when the data is called up for move out from the second storage unit by a program with which the data is associated. The second error signal generated by the second error code means signals the data processing machine that an error condition exists requiring a machine check.

In accordance with the foregoing, the present invention achieves the object of deferring machine checks that would normally occur when an error is detected upon move out of data from the first storage unit to the second storage unit until the data is accessed by a program with which the data is associated.

DETAILED DESCRIPTION

With reference to the drawings, detailed description of the preferred embodiment of the present invention is provided.

Figure 1:
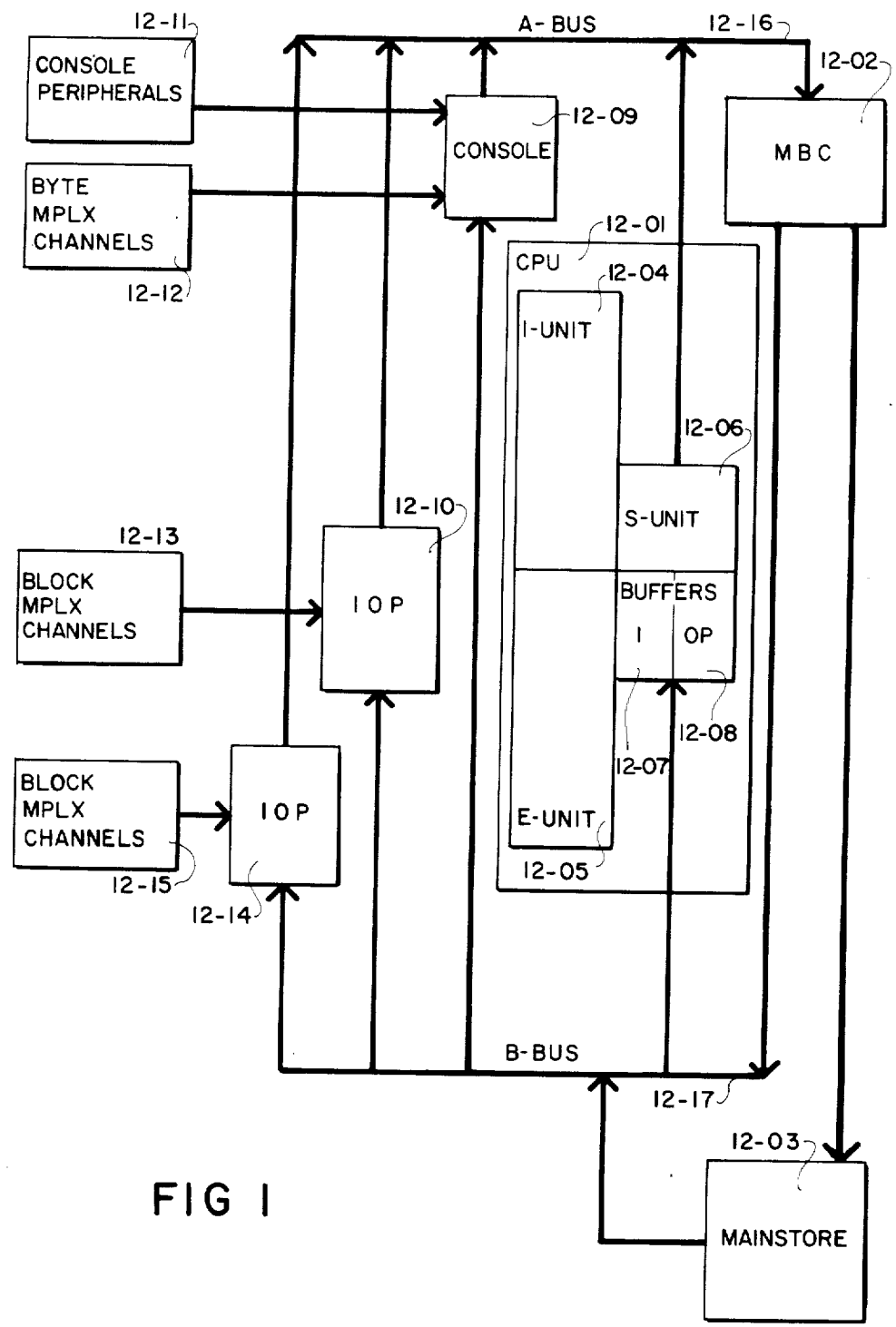
FIG. 1 is a system overview of a data processing machine employing high speed buffers and a main storage unit.

FIG. 1 shows a block diagram of a system overview of the data processing machine D which employs the present invention. The present invention is most closely associated with the central processing unit 12-01, the memory bus controller 12-02, and a main storage unit 12-03. The central processing unit 12-01 includes five subparts as follows: the instruction unit 12-04 (I-UNIT) which fetches, decodes, and controls instructions and controls the central processing unit; the execution unit (E-UNIT) which provides computational facilities for the data processing machine; the storage unit (S-UNIT) which controls the data processing machine's instruction and operand storage and retrieval facilities; the instruction buffer 12-07 which provides high-speed buffer storage for instruction streams; and the operand buffer 12-08 which provides high-speed buffer storage for operand data.

Other major parts of a data processing machine as shown in FIG. 1 include the input-output processor (IOP) 12-10 which receives and processes input-output requests from the central processing unit 12-01 and provides block multiplexer channels; the console 12-09 which communicates with the central processing unit 12-01 to provide system control and byte multiplexer channels 12-12; the memory bus controller (MBC) 12-02 which provides main memory and bus control, system wide coordination of functions and timing facilities; and the main storage unit 12-03 which provides system large capacity memory. A second input-output processor 12-14 and additional mulitplexer channels 12-15 may be included as shown in FIG. 1.

The data processing system shown in FIG. 1 employes a dual bus structure: the A bus 12-16 and the B bus 12-17. The A bus 12-16 carries data from the console 12-09, the input-output processor 12-10, and the central processing unit 12-01 to the memory bus controller 12-02. The B bus 12-17 carries data from the memory bus controller 12-02 and the main storage unit 12-03 to the console 12-09, the input-output processor 12-10 and the central processing unit 12-01.

For a more detailed description of the system overview shown in FIG. 1 refer to the related application entitled VIRTUALLY ADDRESSED CACHE invented by Gene Myron Amdahl, Donald Laverne Hanson and Gary Arthur Woffinden, filed contemporaneously herewith and owned by a common assignee.

The present application is concerned primarily with the flow of data from the high-speed operand buffer 12-08 through the storage unit 12-06 across the A bus 12-16 to the memory bus controller 12-02 to the main storage unit 12-03 and over the B bus 12-17 back to the operand high speed buffer 12-08. The present invention can be applied equally to any configuration of memory arrays as suits the user.

Figure 2:
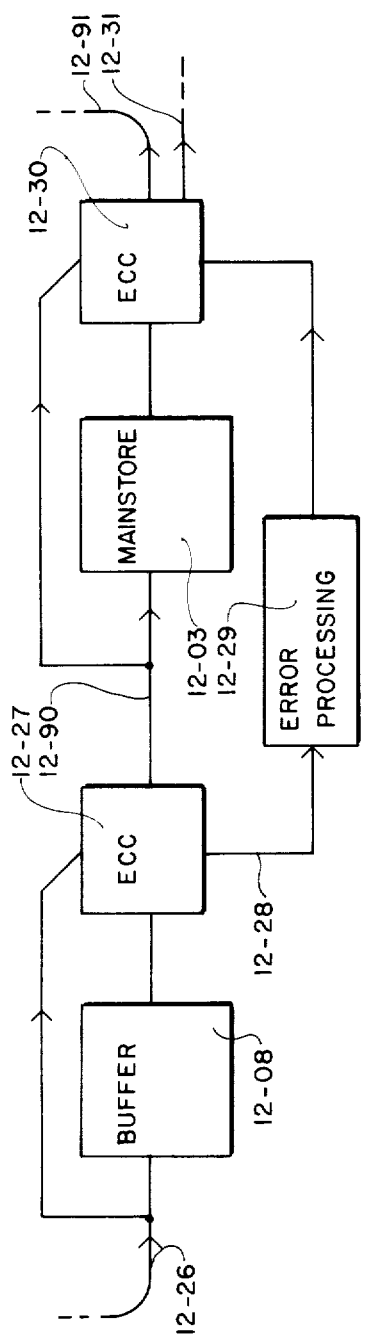
FIG. 2 is a simplified schematic of the present invention showing the data path from the first storage unit to the second storage unit.

Even though the units of the data processing machine shown in FIG. 1 separate the functions of the machine into discrete physical parts, the present invention may be shown by the simplified schematic data path shown in FIG. 2. The data flows as indicated in FIG. 2 by the data line 12-26 into the first storage means, such as operand buffer 12-08, from the second storage means, such as the mainstore 12-03, or other units in the machine D. When the data moves into the buffer 12-08, the operand error checking unit 12-27 generates a code to characterize the data. As the data moves out of the operand buffer 12-08, it is processed by the operand error checking unit 12-27, where the code is regenerated and compared with the code generated when the data entered the buffer 12-08. If any errors have occurred in the operand buffer 12-08, the codes will not match. Some of the detected errors are corrected in the preferred embodiment according to the capabilities of the error checking unit 12-27. Errors which are detected, but not corrected, cause the operand error checking unit 12-27 to generate an error signal 12-28. The data proceeds through the data line 12-90 into the main store 12-03. While the data is being stored into the main store 12-03, the error signal 12-28 is being processed by an error processing unit 12-29. The error processing unit 12-29 then communicates with the main store error checking unit 12-30 indicating that the data contains an error. The main store error checking unit 12-30 then adopts a state, such as by modifying an error code for the data, to recognize the data that has been stored in main store 12-03 as containing an error when the data is moved out of the main store 12-03.

In the preferred embodiment, when the data moves out of the main store 12-03, the main store error checking unit 12-30 will recognize that an error was detected by the operand buffer error checking unit 12-27 and generate an error signal 12-31 upon the move-out of the data from main store 12-03 across the data line 12-91. The error signal 12-31 produced by the main store error checking unit 12-30 will then cause a machine check. In accordance with the present invention, therefore, when an uncorrectable error is detected in the operand buffer 12-08, the machine check 12-31 will not occur immediately. Rather the machine check 12-31 is deferred until the data is moved out of the main store 12-03 when it is called up by a program with which the data is associated. For this reason, the machine check 12-31 that is generated by the uncorrectable error will confine the damage to the program(s) with which the erroneous data is associated.

Figure 3:
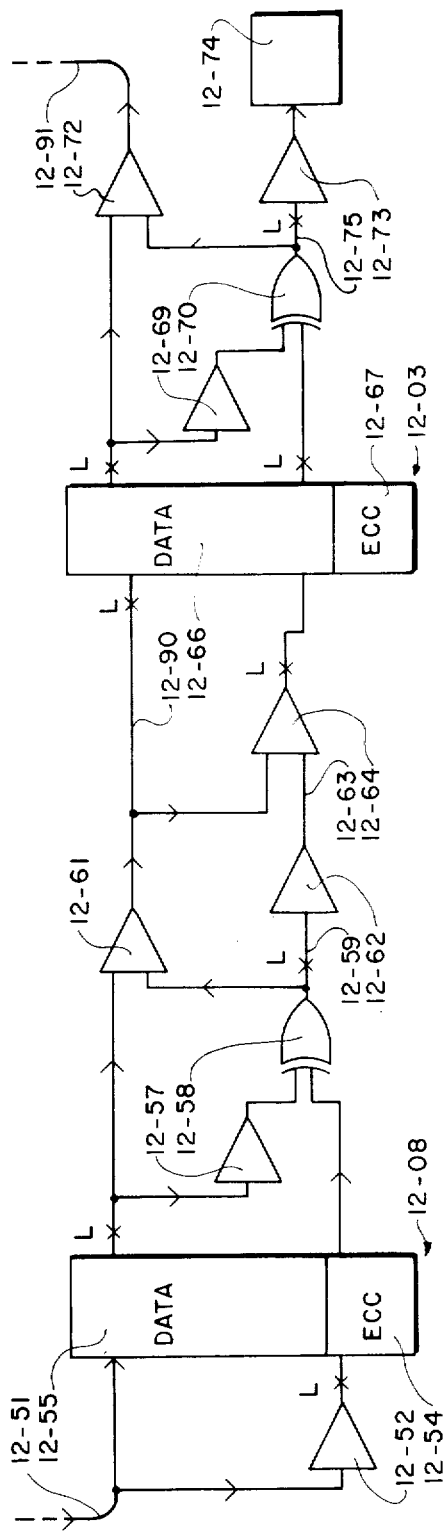
FIG. 3 is an expanded schematic diagram of the data path of the preferred embodiment to the present invention.

A more detailed schematic data path showing the preferred embodiment of the present invention is depicted in FIG. 3. Starting at the move-in of data into the operand buffer 12-08, the data enters through the data line 12-51 from the mainstore 12-03 or other units in the machine D. As the data enters the operand buffer 12-08, it is stored in the data portion 12-55 of the operand buffer 12-08. Before or at the same time the data is stored in the data portion 12-55, the operand move-in ECC code (error checking and correcting code) generator 12-52 generates an ECC code for the data which is stored into the ECC code portion 12-54 of the operand buffer 12-08. Thus the operand buffer 12-08 stores both data and the ECC code for the data on move-in of the data to the operand buffer 12-08. The user may segregate the storage of the ECC code and data any manner desired so long as the ECC code is available when the data is moved out of the buffer 12-08.

As the data is moved out of the operand buffer 12-08 the operand move-out ECC code generator 12-57 recomputes the ECC code for the data. At the same time, the ECC code that was computed upon move-in is read out of the ECC code portion 12-54 of the operand buffer 12-08 and passes through an exclusive-OR gate 12-58 with the operand move-out ECC code. If desired, the same hardware that generates the ECC code upon move-in may be used to generate the ECC code upon move-out, operating on a time-shared basis. The result of the exclusive-OR of the two ECC codes produces a syndrome 12-59 which communicates with the correct data logic unit 12-61. If the data contains no error, or there is a correctable error detected, the correct data logic unit 12-61 presents the corrected data back to the data line 12-90. If the data contains an uncorrectable error, the correct data logic unit 12-61 is incapable of correcting the data, so the data is presented to the data line 12-90 containing an uncorrectable error. Further, the uncorrectable error processing unit 12-62 reads the syndrome 12-59 and produces an uncorrectable error signal 12-63.

The data proceeds from the correct data logic unit 12-61 across the data path 12-90 either its correct or uncorrectable state to the main storage unit 12-03. In the present invention we are concerned with the events that occur when an uncorrectable error occurs in the data so we will neglect the case where the data is correct and being moved into the main store 12-03. Likewise, the details of the operand error checking and correcting mechanism are not important to the present invention. The function can be accomplished many ways including the same mechanism as used in association with the mainstore 12-03 as described below. For details of the operand error checking and correcting function in the preferred embodiment see related application entitled APPARATUS FOR REDUCING STORAGE NECESSARY FOR ERROR CORRECTION AND DETECTION IN DATA PROCESSING MACHINES invented by Gary Arthur Woffinden and Joseph Anthony Petolino, Jr., filed contemporaneously herewith and owned by a common assignee.

So uncorrectable data is presented to the main store 12-03 over the data line 12-90 and to the mainstore move-in ECC code generator 12-64 in the scenario associated with the present invention. Also, the uncorrectable error signal 12-63 produced by the uncorrectable error processing unit 12-62 is presented to the main store move-in ECC code generator 12-64 signalling that an uncorrectable error resides in the data that was presented to main store 12-03. Thus when the data on move-in to the main store 12-03 is presented to the main store move-in ECC code generator 12-64, it is presented in conjunction with a uncorrectable error signal 12-63 from the uncorrectable error processing unit 12-62. The mainstore move-in ECC code generator 12-64 then produces a ECC code which will signal that the data stored contained an uncorrectable error when it was moved out of the buffer 12-08. Thus the data is moved in to the data portion 12-66 of the mainstore 12-03 in its uncorrectable state, and the mainstore move-in ECC code indicating an uncorrectable error is stored into the mainstore ECC code portion 12-67.

Upon receiving a request for the data containing the uncorrectable error through a control unit (not shown), a mainstore move-out occurs as follows: the data containing the uncorrectable error is presented to the main store move-out ECC code generatore 12-69. If desired, the same hardware that generates the ECC code upon move-in may be used to generate the ECC code upon move-out, operating on a time-shared basis. The main store move-in ECC code stored in the ECC code portion 12-67 of the mainstore 12-03 is then presented to an exclusive-OR gate 12-70 along with the newly-generated main store move-out ECC code, and a syndrome 12-75 is produced. The syndrome 12-75 is presented to the main store correct data logic unit 12-72 and the main store error analysis unit 12-73. The mainstore error analysis unit 12-73 detects that the data was received by the mainstore 12-03 with an uncorrectable error. Thus the mainstore error analysis unit 12-73 produces a signal which causes a error condition 12-74 to occur. During the error condition 12-74, a machine check is performed in order to diagnose the error that is confined to the process moving out the data from the mainstore 12-03.

As described above, the machine check occurs only when the data is requested from main store 12-03. Thus at the time of the machine check, the program with which the data containing the uncorrectable error is associated is in control of the machine.

In FIG. 3, the parts of the present invention are distributed along a path between the operand buffer 12-08 and mainstore 12-03 in the S-unit 12-06 and the memory bus controller 12-02. So it involves the flow of data across both the A bus 12-16 and the B bus 12-17 as described with reference to FIG. 1. However, the parts of the present invention can be arranged in a variety of ways as suits the user.

As is discussed above with reference to FIG. 2, error checking the correcting units, 12-27, 12-30, are associated with both the operand buffer 12-08 and the main storage unit 12-03. Single-error correcting, double-error detecting logic is provided by the error checking and correcting units 12-27, 12-30 for both mainstore 12-03 and the operand buffer 12-08. In both cases checking is done on 64-bit blocks of data. Most important to the present invention is the ECC code logic associated with the mainstore 12-03, so it will be described in detail.

Mainstore ECC logic consists of an 8-bit Hamming code described by the Hamming matrix 'H' shown in Table 1. The mod-2 matrix equation satisfied by this code is $$Hx = a$$

where 'x' is the column vector

[Data bits (0:63); ECC Code bits (0:7)]

and 'a' is the column vector

[0 1 1 1 1 1 1 1].

TABLE 1

Hamming Matrix H

| Bit No. | Byte 0 | | | | | | | | Byte 1 | | | | | | | | Byte 2 | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| C0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| C1 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 |
| C2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| C3 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |
| C4 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| C5 | 0 | 1 | 1 | 1 | 0 | 0 | 0 | 1 | 0 | 1 | 1 | 1 | 0 | 0 | 0 | 1 | 0 | 1 | 1 | 1 | 0 | 0 | 0 | 1 |
| C6 | 1 | 0 | 1 | 1 | 0 | 1 | 1 | 0 | 1 | 0 | 1 | 1 | 0 | 1 | 1 | 0 | 1 | 0 | 1 | 1 | 0 | 1 | 1 | 0 |
| C7 | 1 | 1 | 0 | 1 | 1 | 0 | 1 | 0 | 1 | 1 | 0 | 1 | 1 | 0 | 1 | 0 | 1 | 1 | 0 | 1 | 1 | 0 | 1 | 0 |

| Bit No. | Byte 3 | | | | | | | | Byte 4 | | | | | | | | Byte 5 | | | | | | | |
|---|---|---|---|---|---|---|---|---|---|---|---|---|---|---|---|---|---|---|---|---|---|---|---|---|
| | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| C0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| C1 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| C2 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| C3 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| C4 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| C5 | 0 | 1 | 1 | 1 | 0 | 0 | 0 | 1 | 0 | 1 | 1 | 1 | 0 | 0 | 0 | 1 | 0 | 1 | 1 | 1 | 0 | 0 | 0 | 1 |
| C6 | 1 | 0 | 1 | 1 | 0 | 1 | 1 | 0 | 1 | 0 | 1 | 1 | 0 | 1 | 1 | 0 | 1 | 0 | 1 | 1 | 0 | 1 | 1 | 0 |
| C7 | 1 | 1 | 0 | 1 | 1 | 0 | 1 | 0 | 1 | 1 | 0 | 1 | 1 | 0 | 1 | 0 | 1 | 1 | 0 | 1 | 1 | 0 | 1 | 0 |

| Bit No. | Byte 6 | | | | | | | | Byte 7 | | | | | | | | ECC Code | | | | | | | |
|---|---|---|---|---|---|---|---|---|---|---|---|---|---|---|---|---|---|---|---|---|---|---|---|---|
| | 48 | 49 | 50 | 51 | 52 | 53 | 54 | 55 | 56 | 57 | 58 | 59 | 60 | 61 | 62 | 63 | C0 | C1 | C2 | C3 | C4 | C5 | C6 | C7 |
| C0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| C1 | 0 | 0 | 0 | 0 | 0 | 0 | 0 | 0 | 1 | 1 | 1 | 1 | 1 | 1 | 1 | 1 | 0 | 1 | 0 | 0 | 0 | 0 | 0 | 0 |
| C2 | 1 | 1 | 1 | 1 | 1 | 1 | 1 | 1 | 1 | 1 | 1 | 1 | 1 | 1 | 1 | 1 | 0 | 0 | 1 | 0 | 0 | 0 | 0 | 0 |
| C3 | 1 | 1 | 1 | 1 | 1 | 1 | 1 | 1 | 1 | 1 | 1 | 1 | 1 | 1 | 1 | 1 | 0 | 0 | 0 | 1 | 0 | 0 | 0 | 0 |
| C4 | 0 | 0 | 0 | 0 | 1 | 1 | 1 | 1 | 0 | 0 | 0 | 0 | 1 | 1 | 1 | 1 | 0 | 0 | 0 | 0 | 1 | 0 | 0 | 0 |
| C5 | 0 | 1 | 1 | 1 | 0 | 0 | 0 | 1 | 0 | 1 | 1 | 1 | 0 | 0 | 0 | 1 | 0 | 0 | 0 | 0 | 0 | 1 | 0 | 0 |
| C6 | 1 | 0 | 1 | 1 | 0 | 1 | 1 | 0 | 1 | 0 | 1 | 1 | 0 | 1 | 1 | 0 | 0 | 0 | 0 | 0 | 0 | 0 | 1 | 0 |
| C7 | 1 | 1 | 0 | 1 | 1 | 0 | 1 | 0 | 1 | 1 | 0 | 1 | 1 | 0 | 1 | 0 | 0 | 0 | 0 | 0 | 0 | 0 | 0 | 1 |

Note that this results in an ECC code whose low-order bits are odd parity bits over subsets of the data bits and ECC code bit 0 is an even parity bit over all data and ECC code bits. Thus, a data word 64 zeros would have an all-ones ECC code. This code is generated by the mainstore move-in ECC code generator 12-04 with every 64-bit store into mainstore 12-03—the 64 data bits plus eight ECC code bits are stored together as a 72-bit block which makes up both the data portion 12-66 and the ECC code portion 12-67 of the mainstore 12-03 for each block of data.

When storing a block of data, or word, which is known to have an error (e.g. one which had uncorrectable errors on move-out from the operand buffer 12-08) the uncorrectable error signal 12-63 from the uncorrectable error processing unit 12-62 is received by the mainstore move-in ECC code generator 12-64 which, in response to the signal, exclusive-OR's a special syndrome code into the ECC code bits to produce a special ECC code which is stored in place of the normal ECC code. Upon retrieval from mainstore 12-03, this special syndrome will be recognized as such by the error checking and correcting logic on mainstore error analysis unit 12-73.

When the block which is known to be incorrect, that is a block which had an uncorrectable error on move-out from the operand buffer 12-08, is moved out from the mainstore 12-03, the mainstore move-out ECC code generator 12-69 recalculates the ECC code that applies to the data containing the error. When the ECC code generated by the mainstore move-out ECC code generator 12-69 is exclusive-ORed with the special mainstore ECC code which is stored in the ECC code portion 12-67 of the mainstore 12-03, the special syndrome will be retrieved at the output of the exclusive-OR gate 12-70 (assuming no further errors occurred in the mainstore). The mainstore error analysis unit 12-73 will recognize the special syndrome as indicating that the data contained an uncorrectable error that was detected when the data moved out of the buffer 12-08, and signal a error condition 12-74 reflecting that fact. Thus the machine check which occurs will be able to confine the damage to the program with which the erroneous data is associated.

Using the Hamming matrix of Table 1, it can be seen that even if a single bit error occurs in the mainstore 12-03 on top of the stored uncorrectable error, the machine will still recognize that the data contains an error, though it will not recognize the error as having occurred in the buffer 12-08. For example, assume the data block containing an uncorrectable error broken into eight eight-bit bytes reads as follows (in hexadecimal):

| Byte No | 0 | 1 | 2 | 3 | 4 | 5 | 6 | 7 |
|---|---|---|---|---|---|---|---|---|
| | 01 | 23 | 45 | 67 | 89 | AB | CD | EF |

The normal ECC code will be 7F. If the mainstore move-in ECC code generator 12-64 has received the uncorrectable error signal 12-63, the normal ECC code is exclusive-ORed with the special syndrome which is always 8F in the preferred embodiment producing ECC code equal to F0 (7F XOR 8F) which will be stored in the ECC code portion 12-67 of the mainstore 12-03. When the data is moved out of the mainstore 12-03, the mainstore move-out ECC code generator 12-69 will produce the normal ECC code 7F which will be exclusive-ORed with the stored ECC code F0, producing 8F (7F XOR F0)—the special syndrome. The mainstore error analysis unit 12-73 then diagnoses an uncorrectable error that was detected on move-out from the buffer 12-08.

If a single bit error occurs in the mainstore 12-03, for instance bit 6 of byte 7, the mainstore move-out ECC code generator 12-64 will see byte seven as ED, which along with the other seven bytes produces a normal ECC code of 84. When XORed with the stored ECC code F0 the syndrome produced is 74 (84 XOR F0). The mainstore error analysis unit will recognize this syndrome as an uncorrectable error although not as an error that occured in the buffer 12-08.

The syndromes 12-75 for each single bit error in data blocks detected by the error checking and correcting code mechanism can be derived by referring to Table 1. The syndrome 12-75 for an error in a given bit is derived directly by referring to Table 1 at the bit at which the error occurs. The eight-bit column at the given bit will be the syndrome 12-75 indicating an error in that bit. For example, a single bit error at bit 6 of byte 7 produces the syndrome 11111011. If no errors occur, the syndrome 12-75 will be all zeros. All double bit errors that occur will have a non-zero syndrome which does not match any of the single bit error syndromes and has a zero in the first syndrome bit. Note that the special syndrome 8F can occur in the event of some odd number of bits errors, independent from any buffer error. However that event is relatively rare and does not detract appreciably from error isolation.

The terms "line", "word", "byte" or other designations of blocks of data bits used in this application do not refer to specific sizes of blocks of data bits unless otherwise indicated. As known in the art, data may be organized into lines, words, bytes or other sets of bits of any size as suits the user.

All the logic circuitry and the high speed buffers 12-07, 12-08 of the preferred embodiment are implemented with emitter coupled logic (ECL). The mainstore 12-03 is implemented with dynamic MOS technology. Note that other data processing circuitry and storage technologies may be used without detraction from the present invention.

Further, in order to simplify the description, the latch points in the figures have been left out. However, latches occur in the circuitry at points necessary according to the timing of the particular machine. For example, typical latch points L occur as indicated in FIG. 3.

Thus, as can be seen from the above, the uncorrectable error processing unit of the present invention prevents a severe error condition from occurring when an uncorrectable error appears in data upon move-out from the operand buffer 12-07. Rather the error condition occurs only when the data is requested from main store 12-03 by a program with which the data is associated. In this manner, the machine check which occurs will confine the damage to the program with which the error is associated.

While the invention has been particularly shown and described with reference to the preferred embodiments thereof it will be understood by those skilled in the art that various changes in form in detail may be made therein without departing from the spirit and scope of the invention.

We claim:

1. In a data processing system, an apparatus for storing data comprising:
   a first storage means for storing data;
   a first means for checking data for error when said data is moved out from said first storage means and for generating a first error signal when erroneous data is detected;
   a second storage means for storing data in communication with said first storage means so that data may be moved out of said first storage means into said second storage means;
   a second means for checking data for errors when said data is moved out from said second storage means and for generating a second error signal when said data contains a error; and
   error processing means receiving said first error signal when said erroneous data is moved out from said first storage means and in to said second storage means, for causing said second means to generate said second error signal when said erroneous data is moved out of said second storage means, wherein said first means includes:
   a first move-in error code generator means for generating a first move-in error code when said data is moved in to said first storage means and for storing said first move-in error code along with said data; and
   a first error code checking means for generating a first move-out error code when said data is moved out of said first storage means and for comparing said first move-out error code with said first move-in error code to detect errors; and
   said second means includes:
   second move-in error code generator means for generating a second move-in error code when said data is moved in to said second storage means and for storing said second move-in error code along with said data; and
   a second error code checking means for generating a second move-out error code when said data is moved out of said second storage means and for comparing said second move-out error code with said second move-in error code to detect errors; and
   said error processing means includes means, in communication with said second move-in error code generator means for modifying the second move-in error code when the first error signal is generated so that said second error code checking means detects the error indicated by the first error signal.

2. The apparatus of claim 1, wherein:
   said first storage means is a high speed buffer storage unit and said second storage means is a large capacity mainstore.

3. The apparatus of claim 1 further including:
   error condition control means for receiving said second error signal and causing a machine check of the data processing system.

4. The apparatus of claim 1, wherein said first error code means further includes:
   first correct data means for correcting all single bit errors detected when said data is moved out of said first storage means; and wherein
   said first error signal is generated only when uncorrectable errors are detected.

5. The apparatus of claim 4, further including:

second correct data means for correcting single bit errors detected when said data is moved out of said second storage means; and wherein said second error signal is generated only when uncorrectable errors are detected.

6. In a data processing system, an apparatus for storing data comprising:

a first storage means for storing data;

a first move-in error code generator means for generating a first move-in error code when said data is moved into said first storage means;

a first error code checking means for generating a first move-out error code when said data is moved out of said first storage means and for comparing said first move-out error code with said first move-in error code to thereby detect errors in said data, and for generating a first error signal when erroneous data is detected;

a second storage means for storing data in communication with said first storage means so that data may be moved out of said first storage means into said second storage means;

a second move-in error code generator means for generating a second move-in error code when data is moved into said second storage means;

a second error code checking means for generating a second move-out error code when said data is moved out of said second storage means, for comparing said second move-out error code with said second move-in error code to thereby detect errors in said data, and for generating a second error signal when erroneous data is detected; and error processing means, receiving said first error signal, for causing said second move-in error code generator means to generate a modified second move-in error code indicating that the data contains an error so that when said erroneous data in moved out of said second storage means, said second error code checking means generates said second error signal in response to said first error signal.

7. The apparatus of claim 6 wherein:

said first storage means is a high-speed buffer storage unit and said second storage means is a large capacity mainstore.

8. The apparatus of claim 6 further including:

error condition control means for receiving said second error signal and causing a machine check of the data processing system.

9. The apparatus of claim 6 wherein said first error code means further includes:

first correct data means for correcting all single bit errors detected when said data is moved out of said first storage means; and wherein said first error signal is generated only when uncorrectable errors detected.

10. The apparatus of claim 9 further including:

second correct data means for correcting all single bit errors detected when said data is moved out of said second storage means; and wherein:

said second error signal is generated when uncorrectable errors are detected.

11. The apparatus of claim 6, wherein:

said second error code checking means detects the modified second move-in error code indicating that said error was detected by said first error code checking means.

12. In a data processing system having a buffer storing lines of data, each line being associated with a buffer error detection code, and a main store storing lines of data, each line being associated with a main store error detection code; and having a data path between the buffer and the main store and buffer management logic by which lines of data are transferred to the main store from the buffer to make room for new lines of data needed for an active process in the data processing system and are transferred from the main store to the buffer in response to a need by the active process, an apparatus for deferring reporting of errors comprising:

buffer error detecting means, connected to receive a line of data and the associated buffer error detection code when the line is transferred from the buffer to the main store, for detecting errors in the line of data before storage in the main store and for asserting a buffer error signal if an error is detected;

main store move-in error code generating means, connected to receive the line of data from the data path when the line of data is moved out of the buffer and to receive the buffer error signal, for supplying the main store error detection code for storage in association with the line of data in the main store, including means, responsive to the line of data, for generating an error detection code, means, responsive to the buffer error signal for generating a buffer error flag indicating whether the buffer error signal is asserted, and second level means for supplying the error detection code and buffer error flag as the main store error detection code;

main store move-out error detection means, connected to receive the line of data and the main store error detection code associated with the line of data when the line of data is moved out of the main store in response to an active process, for detecting errors in the line of data; and means, in communication with the main store move-out error detection means and responsive to the detection of an error or the buffer error flag, for generating an error condition signal during the active process for which the line is needed.

13. The apparatus of claim 12, wherein the means for generating the buffer error flag comprises:

means for combining the error detection code with a special syndrome if the buffer error signal is asserted.

14. The apparatus of claim 13, wherein said means for combining includes a means, connected to receive the special syndrome and the error detection code, for generating a modified error detection code by an exclusive OR function;

said main store move-out error detection means includes means, responsive to the line of data, for generating the move-out error detection code, and exclusive OR-means connected to receive the move-out error detection code and the main store error detection code associated with the line of data, for generating a syndrome by the exclusive OR function indicating errors in the line of data, whereby the syndrome will equal the special syndrome if the main store error detection code is a modified error detection code.

15. The apparatus of claim 12 wherein the buffer error detecting means further includes:

buffer correcting data means for correcting all single bit errors detected when the line is moved out of the buffer; and wherein the buffer error signal is generated only when uncorrectable errors are detected.

16. The apparatus of claim 12 further including:

main store correcting means for correcting all single bit errors detected when the line is moved out of the main store, and wherein:

the error condition signal is generated only when uncorrectable error or the buffer error flag are detected.

* * * * *